United States Patent
Zhu (10) Patent No.: US 11,661,085 B2
(45) Date of Patent: May 30, 2023

(54) LOCKED PEDESTRIAN DETECTION AND PREDICTION FOR AUTONOMOUS VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 429 days.

(21) Appl. No.: 16/892,999

(22) Filed: Jun. 4, 2020

(65) Prior Publication Data
US 2021/0380141 A1 Dec. 9, 2021

(51) Int. Cl.
*B60W 60/00* (2020.01)
*G06T 7/70* (2017.01)
*G06V 20/58* (2022.01)
*G06V 20/56* (2022.01)
*G06V 40/10* (2022.01)

(52) U.S. Cl.
CPC .... *B60W 60/0027* (2020.02); *B60W 60/0017* (2020.02); *G06T 7/70* (2017.01); *G06V 20/58* (2022.01); *G06V 20/588* (2022.01); *G06V 40/103* (2022.01); *B60W 2420/42* (2013.01); *B60W 2420/52* (2013.01); *B60W 2552/00* (2020.02); *B60W 2554/4029* (2020.02); *G06T 2207/10028* (2013.01); *G06T 2207/30196* (2013.01); *G06T 2207/30241* (2013.01); *G06T 2207/30256* (2013.01); *G06T 2207/30261* (2013.01)

(58) Field of Classification Search
CPC ......... B60W 60/0027; B60W 60/0017; B60W 2420/42; B60W 2420/52; B60W 2552/00; B60W 2554/4029; G06T 7/70; G06T 2207/10028; G06T 2207/30196; G06T 2207/30256; G06T 2207/30241; G06V 20/588; G06V 40/103
See application file for complete search history.

(56) References Cited

U.S. PATENT DOCUMENTS

| 2017/0057497 A1* | 3/2017 | Laur ..................... B60W 40/02 |
| 2019/0283746 A1* | 9/2019 | Shalev-Shwartz ... G05D 1/0221 |
| 2021/0245744 A1* | 8/2021 | Mangalam ............. G06V 20/56 |

\* cited by examiner

*Primary Examiner* — Kenneth J Malkowski
(74) *Attorney, Agent, or Firm* — Womble Bond Dickinson (US) LLP (57) ABSTRACT

Embodiments is disclosed to detect a locked heading direction of a pedestrian and to predict a path for the pedestrian using the locked heading direction. According to one embodiment, a system perceives an environment of an autonomous driving vehicle (ADV) using one or more image capturing devices. The system detects a pedestrian in the perceived environment. The system determines a facing direction of the pedestrian relative to the ADV as one of left/right side, front, or back. If the facing direction of the pedestrian is determined to be front or back facing, the system determines a lane nearest to the pedestrian. The system projects the pedestrian onto the nearest lane to determine a lane direction at the projection. The system determines a heading direction for the pedestrian locking to the lane direction of the nearest lane based on a predetermined condition.

17 Claims, 7 Drawing Sheets

LOCKED PEDESTRIAN DETECTION AND PREDICTION FOR AUTONOMOUS VEHICLES

TECHNICAL FIELD

Embodiments of the present disclosure relate generally to operating autonomous driving vehicles. More particularly, embodiments of the disclosure relate to locked pedestrian detection and prediction for autonomous driving vehicles (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Perception and prediction are critical operations in autonomous driving. However, pedestrians sometimes may not be perceived to walk in straight lines because they may turn and swing their arms. Turning, as well as, erratic arm movements however can cause perception to perceive a changing heading detections for the pedestrian. With a changing heading direction, perception and planning systems of an autonomous driving vehicle (ADV) may erroneously detect and predict that a pedestrian will walk straight into a roadway when they are actually walking along a sidewalk or a road lane.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Pedestrian does not always walk straight and they may swing their arms and turn. With such movements, perception and prediction modules of an autonomous driving vehicle (ADV) might predict erratic pedestrian behaviors. Embodiments is disclosed to detect a locked heading direction of a pedestrian and to predict a path for the pedestrian using the locked heading direction. According to one embodiment, a system perceives an environment of an autonomous driving vehicle (ADV) using one or more image capturing devices. The system detects a pedestrian in the perceived environment. The system determines a facing direction of the pedestrian relative to the ADV as one of left/right side, front, or back. If the facing direction of the pedestrian is determined to be front or back facing, the system determines a lane nearest to the pedestrian. The system projects the pedestrian onto the nearest lane to determine a lane direction at the projection. The system determines a heading direction for the pedestrian locking to the lane direction of the nearest lane based on a predetermined condition.

Figure 1:
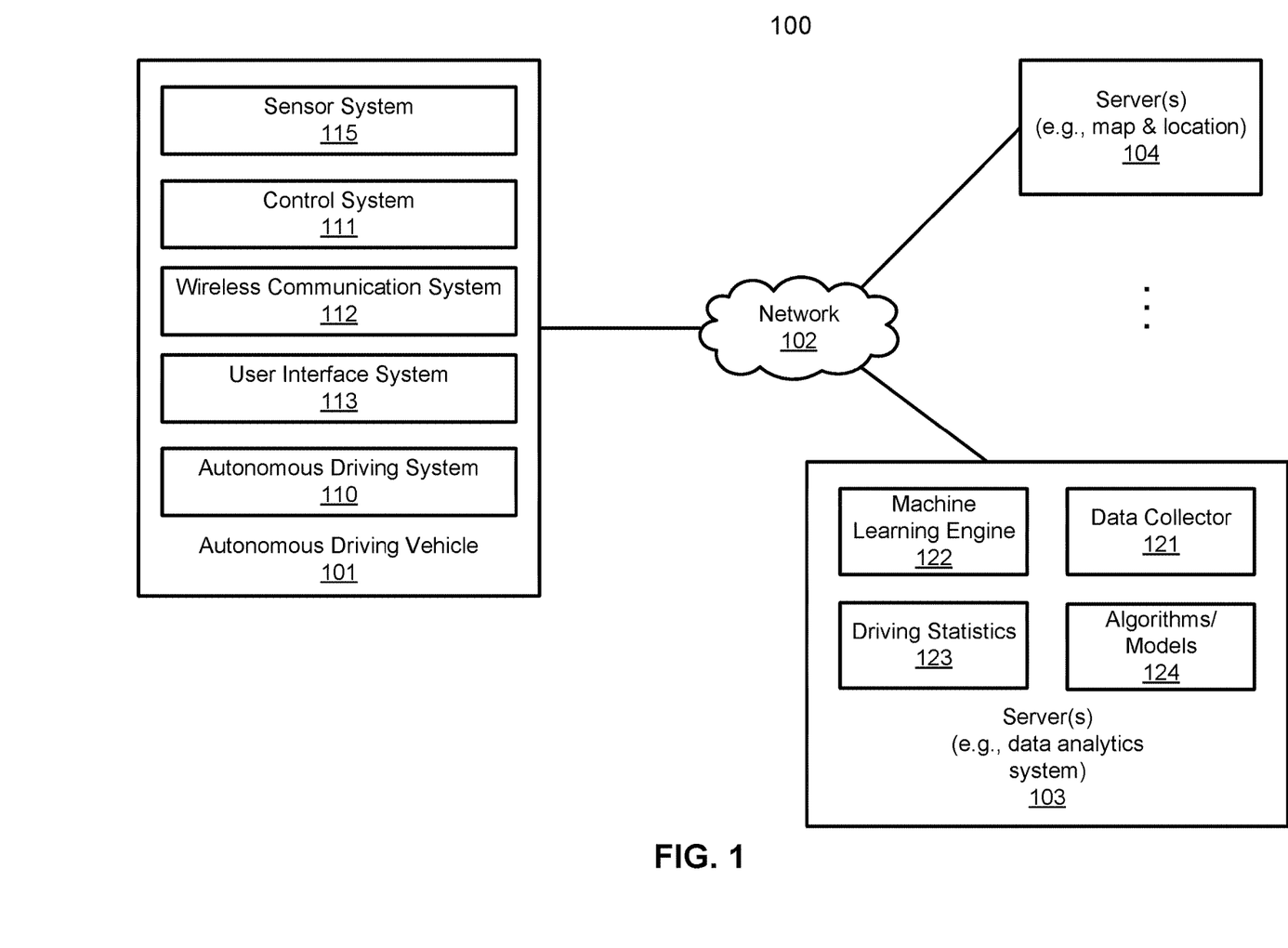
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
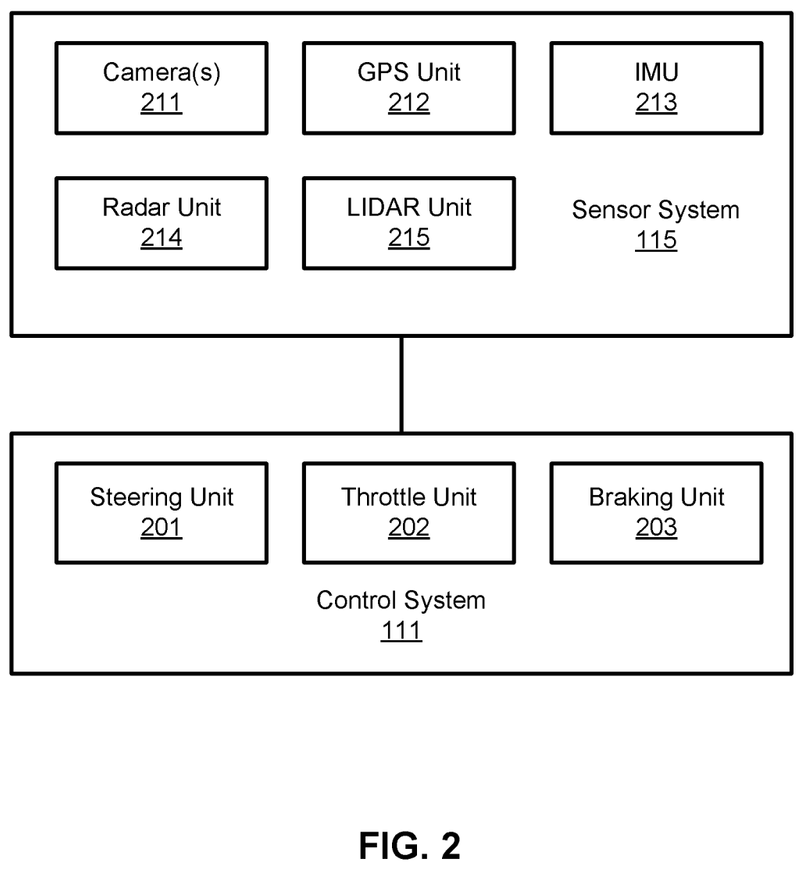
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include algorithms to detect a heading direction for a pedestrian and to generate a path prediction for the pedestrian based on the heading direction. In one embodiment, the heading direction can be a heading direction locked onto a direction of a road/lane nearest to the pedestrian. The locked heading direction assumes the pedestrian will keep within the road/lane even though sensors may detect erratic arm/body movements for the pedestrian. Because a planning system of the ADV may plan a trajectory taking into consideration predictions some time (e.g., 8 seconds) in to the future, the locked heading direction can minimize erratic planning trajectories caused by erratic body movements of pedestrians. Algorithms 124 can then be uploaded on ADVs to be utilized during autonomous driving in real-time.

Figure 3A:
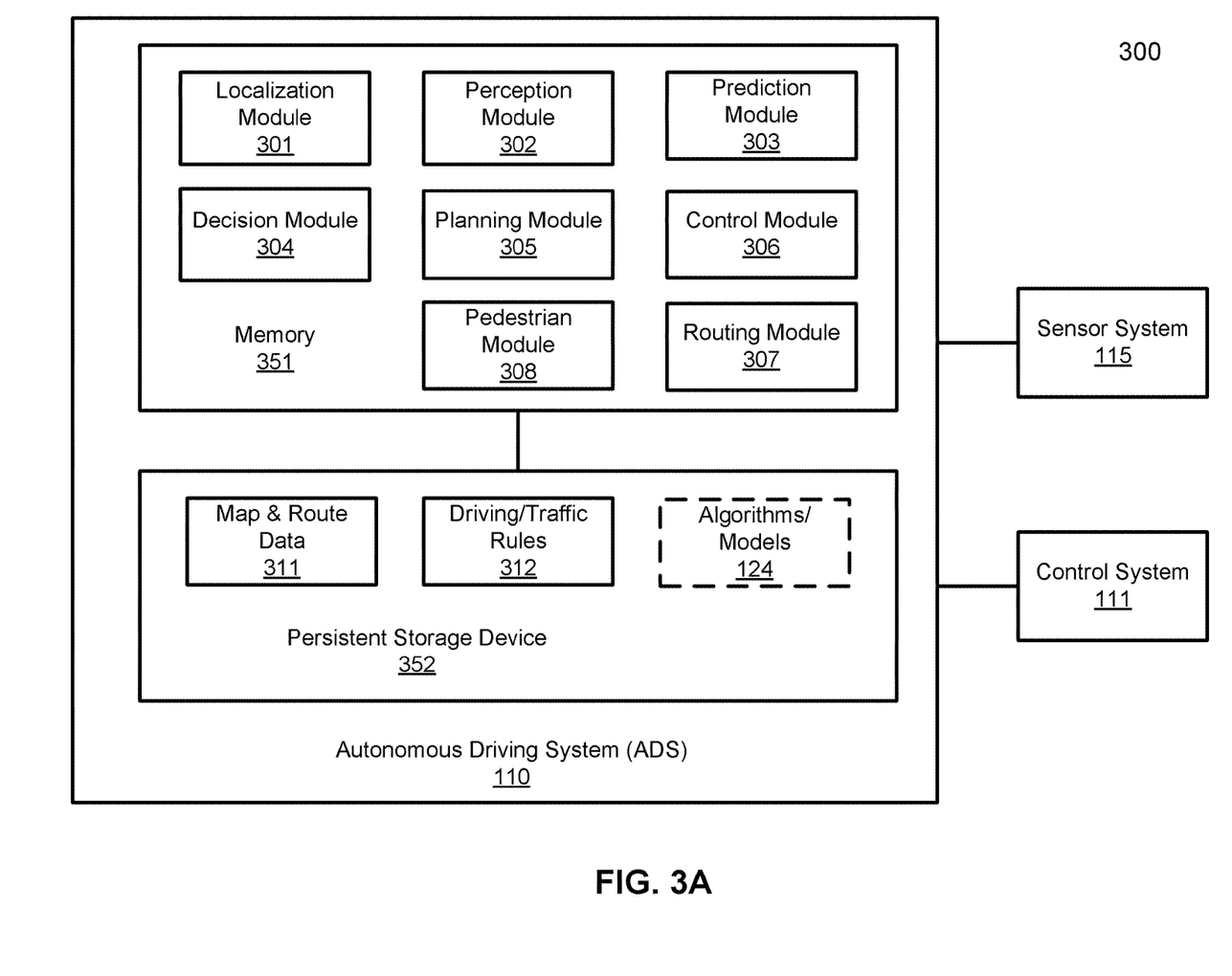
FIGS. 3A-3B are block diagrams illustrating an example of an autonomous driving system used with an autonomous driving vehicle according to one embodiment.
Figure 3B:
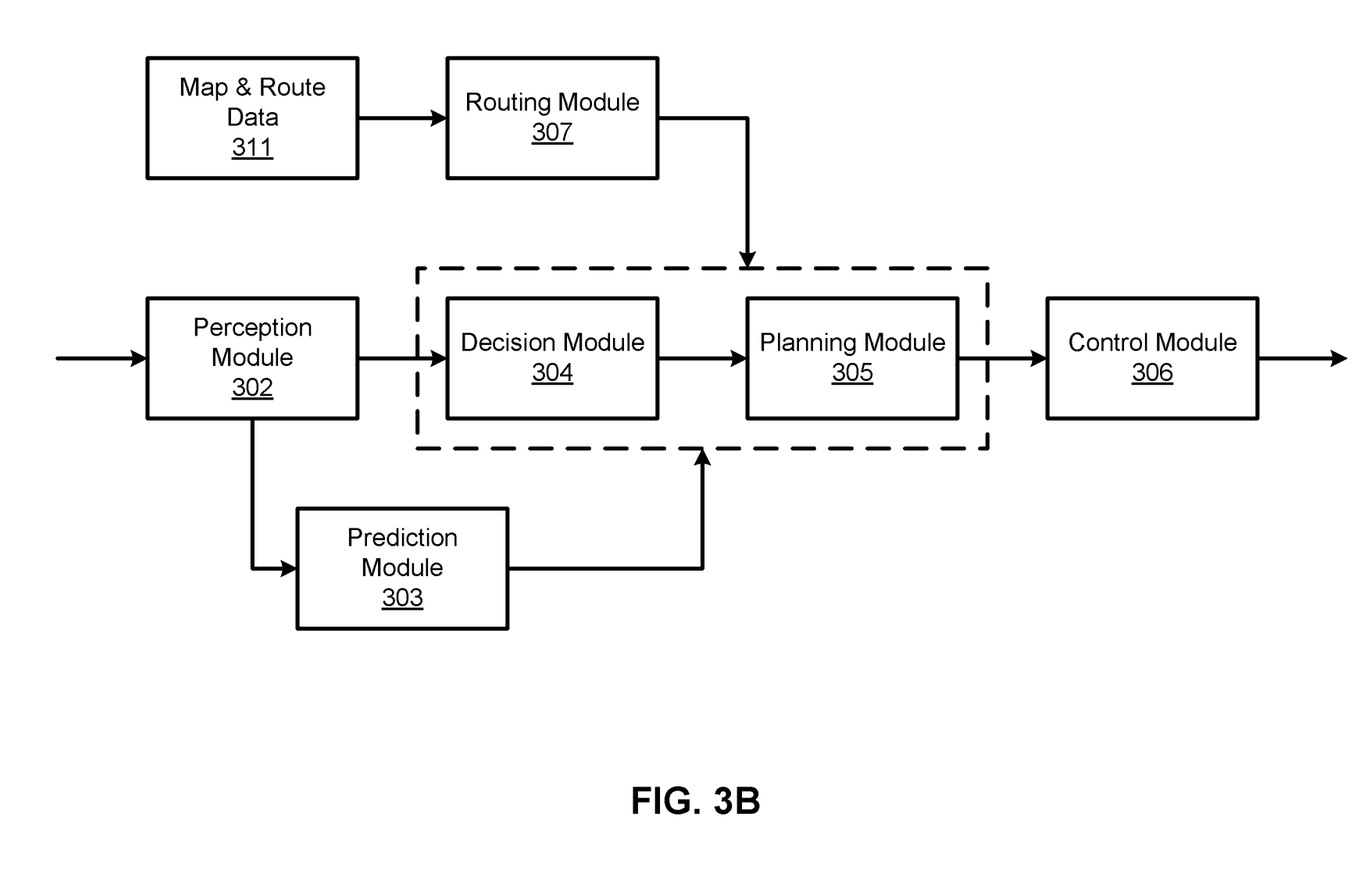

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and pedestrian module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, pedestrian module 308 may be implemented as a part of perception module 302, prediction module 303, and/or planning module 305.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
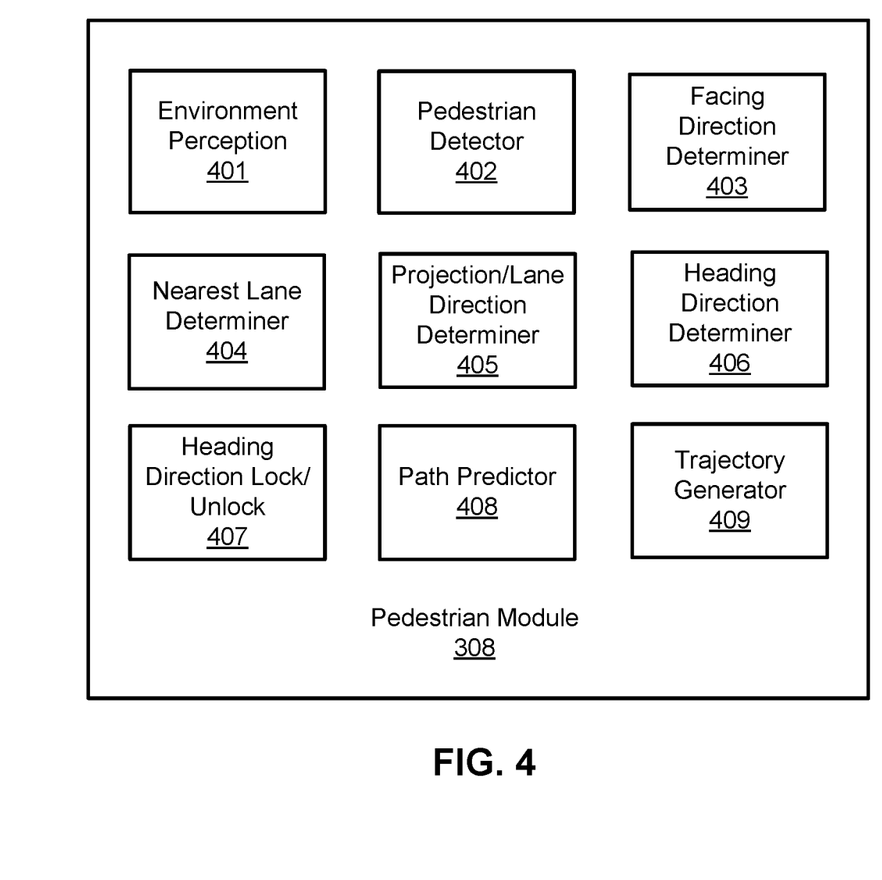
FIG. 4 is a block diagram illustrating a pedestrian module according to one embodiment.

FIG. 4 is a block diagram illustrating an example of a pedestrian module according to one embodiment. Pedestrian module 308 may be implemented as part of autonomous driving system 110 of FIG. 3A to perform pedestrian perceptions and predictions. Pedestrian module 308 can detect an actual heading direction and lock/unlock the heading direction for the pedestrian to a direction of a nearest lane/roadway of the pedestrian. Referring to FIG. 4, pedestrian module 308 may include submodules such as environment perception 401, pedestrian detector 402, facing direction determiner 403, nearest lane determiner 404, projection/lane direction determiner 405, heading direction determiner 406, heading direction lock/unlock 407, path predictor, and trajectory generator 408. Note that some or all of these modules may be integrated into fewer number of modules or a single module.

Environment perception 401 can perceive an environment surrounding the ADV. The environment may be perceived by various sensors/image capturing devices to capture images of the surrounding, including RGB camera(s), LIDAR, RADAR, time-of-flight camera(s), etc. Pedestrian detector 402 can detect one or more pedestrians from the perceived surrounding. The pedestrian may be detected by image detect/object classification algorithms. Facing direction determiner 403 can determine a facing direction for a pedestrian. The facing directions may be left side, right side, back, or front facing. Nearest lane determiner 404 can map the pedestrian onto a map data and determine a nearest lane for the pedestrian. The nearest lane may be a current lane or a lane adjacent to the pedestrian. The nearest lane can be a road path, a vehicle lane, a pedestrian sidewalk, a bike lane, a road boundary, or a road shoulder. Projection/lane direction determiner 405 can project the pedestrian onto a point (such as a midpoint of the lane) at the nearest lane and determine a direction of the lane at that point. In one embodiment, a lane direction can be a direction going with the traffic or a direction going against the traffic of the lane (e.g., bidirectional with 180 degrees). Heading direction determiner 406 can determine a heading direction of a pedestrian. Heading direction lock/unlock 407 can lock/unlock an actual heading direction of a pedestrian to a traffic direction of a nearby lane when a predetermined condition is satisfied. Path predictor 408 can predict a path for a pedestrian based on an actual heading direction or a locked heading direction of the pedestrian. Trajectory generator 409 can generate a trajectory for ADV 101 based on a pedestrian path prediction.

Figure 5:
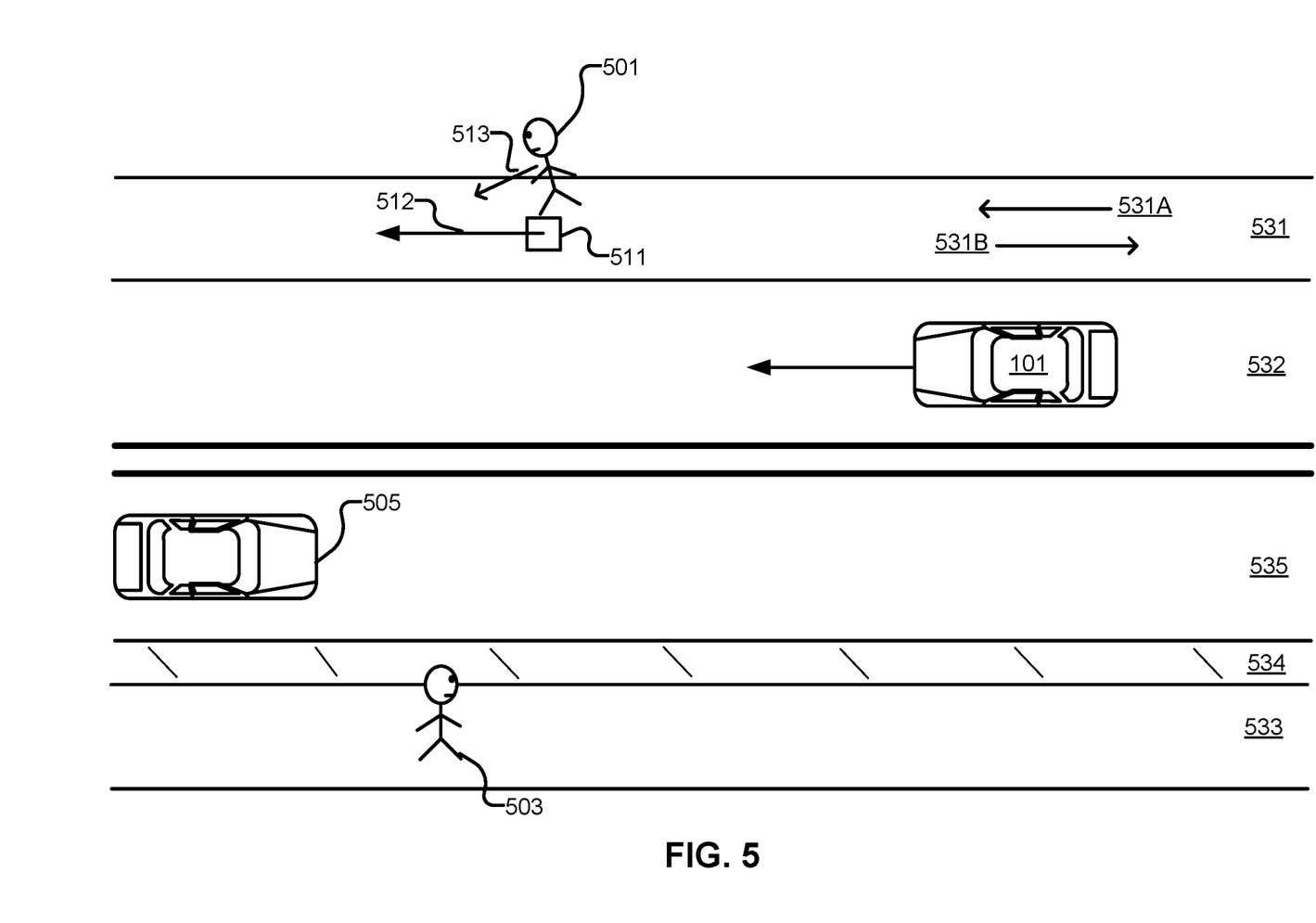
FIG. 5 is a block diagram illustrating a locked pedestrian detection and prediction according to one embodiment.

FIG. 5 is a block diagram illustrating locked pedestrian detection and prediction according to one embodiment. Referring to FIG. 5, for one example, ADV 101 is travelling on lane 532. ADV 101 can perceive a surrounding environment of ADV 101, including obstacles 501-505. In one embodiment, ADV 101 can use image detection and classification algorithms (such as edge detection, machine learning/artificial intelligence algorithms, including convolutional neural network, etc.) to detect obstacles 501 and 503 to be pedestrians, and obstacle 505 to be a vehicle. Based on perception, ADV 101 can determine obstacle 501 is situated on lane 531, obstacle 503 is situated on lane 533, and obstacles 505 is situated on lane 535. Here, lane 534 may be a road shoulder or a bike lane or an island.

In one embodiment, ADV 101 predicts the behaviors of these obstacles 501-505 based on their classification to plan a route for ADV 101 in a next time period (e.g., 8 seconds) to avoid the obstacles 501-505. However, pedestrian perceptions may cause false forecasts. A false forecast/prediction may be caused by observations of arm movements/jerky/shaky gestures of the pedestrians 501-503. For example, ADV 101 may perceive the pedestrians 501-503 swing their arm and/or jerk their body. The swing/jerk motions can lead to a prediction that the pedestrian will exit lane 531 and enter lane 532 for one planning cycle and continue on lane 531 in another planning cycle. These unsteady/false predictions may cause a planning trajectory for the ADV 101 to change abruptly to avoid running into the observed pedestrians.

In one embodiment, pedestrian detection/prediction is locked to minimize false predictions. A locked detection refers to limiting an actual heading direction of a pedestrian to one of several predetermined facing directions (e.g., front facing, back facing, left or right side facing directions) with respect to ADV 101. If an actual heading direction of pedestrian 501 is perceived to turn away from the predetermined facing directions, the facing direction can be unlocked and locked to another facing direction. A locked prediction refers to limiting a predicted path/trajectory of a pedestrian to follow a particular lane (e.g., nearest lane) when a predetermined condition is satisfied, so to reduce a chance of false prediction. Here, the nearest lane can be any types of lanes, such as a roadway, a shoulder, a walkway, a pedestrian side walk, a bicycle lane, etc. The lanes can be identified from by a perception of ADV 101 or map data, such as map & route data 311 of FIG. 3A, of ADV 101. If a lane is not identified, ADV 101 may predict a path for the pedestrians based on the locked facing directions of the pedestrian.

Referring to FIG. 5, a pedestrian module, such as module 308 of FIG. 3A, of ADV 101 can proceed to determine a facing direction for pedestrian 501. In one embodiment, ADV 101 can use imaging cameras to determine the facing direction for pedestrian 501. If the pedestrian has a facing direction to a left or a right side, ADV 101 can plan a trajectory to nudge/yield pedestrian 501, without locking the detection/prediction. E.g., the pedestrian might be crossing the street or crossing at an intersection.

In one embodiment, if the pedestrian is detected to be back or front facing, ADV 101 can plan a trajectory based on a locked pedestrian path prediction for pedestrian 501. For example, ADV 101 can determine that the facing direction of pedestrian 501 is back facing. ADV 101 can determine a nearest lane to pedestrian 501, here, lane 531 is nearest pedestrian 501. Next, ADV 101 projects pedestrian 501 onto a point of the nearest lane (such as a mid-point of lane 531) and determines a traffic direction (e.g., 531A or 531B) of lane 531 at the projection point.

In one embodiment, ADV 101 calculates a heading difference between an actual heading direction 513 of pedestrian 501 detected by an imaging device of ADV 101 (such as a LIDAR device) and the lane direction 531A at the projected point. In this scenario, lane 531 has a lane direction of 531A and/or 531B throughout lane 531.

In one embodiment, if the heading difference is less than the predetermined threshold (e.g., 30 degrees), and ADV 101 is situated on the nearest lane (e.g., lane 531) or adjacent to the nearest lane (e.g., lane 532), ADV 101 locks a path projection for pedestrian 501 to follow the traffic direction of the nearest lane 531. In other words, a predicted trajectory 512 for pedestrian 501 is locked onto direction 531A of lane 531. Here, so long as the heading difference condition is satisfied, the predicted trajectory 512 remains locked.

In one embodiment, the predicted pedestrian trajectory is unlocked when the heading difference is greater than the predetermined threshold (e.g., 30 degrees). ADV 101 can then generate a planning trajectory based on the locked pedestrian trajectory 512. This way, the predicted trajectory 512 remains in direction 531A even if pedestrian 501 suddenly swings his/her arm or turns his/her body so long the heading difference condition to lock the pedestrian trajectory is satisfied.

Referring to FIG. 5, in one embodiment, ADV 101 would not have to lock a detection/prediction for pedestrian 503. Here, pedestrian 503 is not at a lane or an adjacent lane to ADV 101. Thus, pedestrian 503 would likely not affect a planning trajectory for ADV 101.

Figure 6:
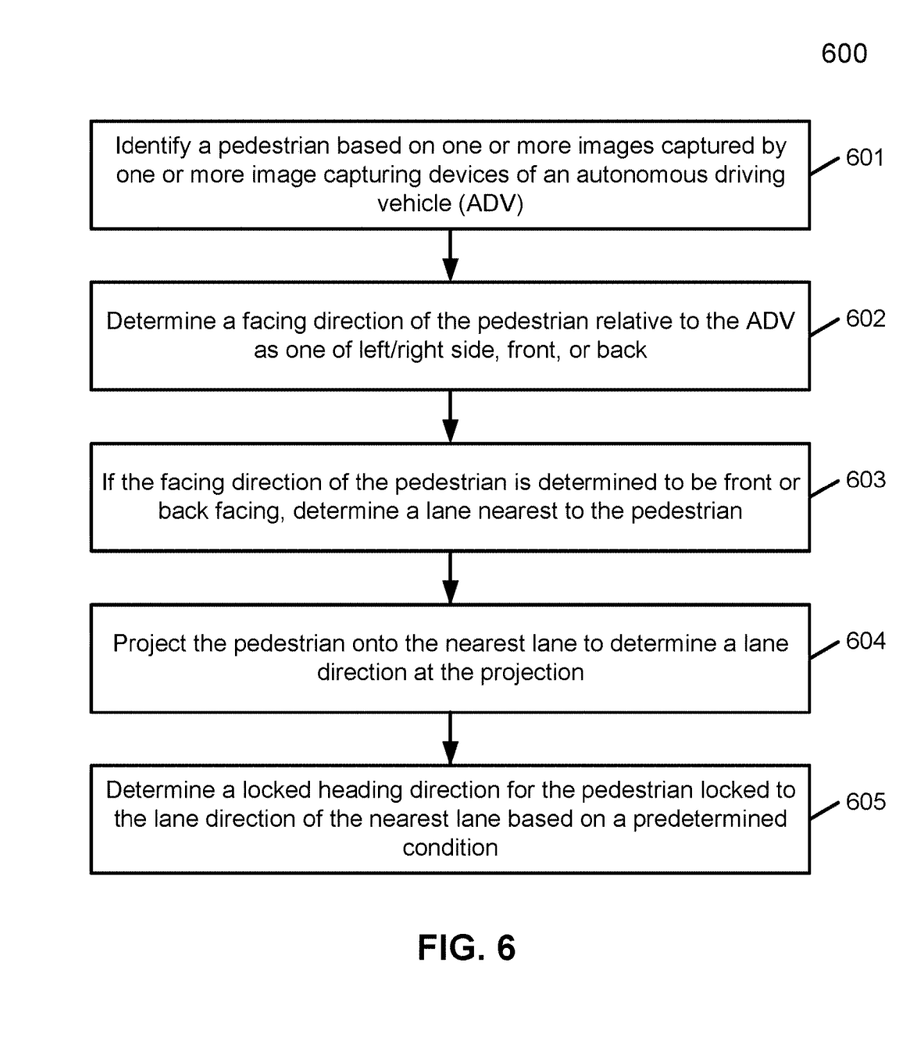
FIG. 6 is a flow diagram illustrating a method according to one embodiment.

FIG. 6 is a flow diagram illustrating a method according to one embodiment. Processing 600 may be performed by processing logic which may include software, hardware, or a combination thereof. For example, process 600 may be performed by pedestrian module 308 of FIG. 3A. Referring to FIG. 6, at block 601, processing logic identifies a pedestrian based on one or more images captured by one or more image capturing devices of an autonomous driving vehicle (ADV). At block 602, processing logic determines a facing direction of the pedestrian relative to the ADV as one of left/right side, front, or back. At block 603, if the facing direction of the pedestrian is determined to be front or back facing, processing logic determines a lane nearest to the pedestrian. At block 604, processing logic projects the pedestrian onto the nearest lane to determine a lane direction at the projection. At block 605, processing logic determines a heading direction for the pedestrian locked to a lane direction of the nearest lane based on a predetermined condition.

In one embodiment, processing logic predicts a path followed by the pedestrian based on the locked heading direction of the pedestrian. In one embodiment, processing logic generates a trajectory to control the ADV based on the predicted path. In one embodiment, processing logic determines an actual heading direction of the pedestrian based on an image captured by the one or more image capturing devices.

In one embodiment, the predetermined condition for determining the locked heading direction includes: an angle between the actual heading direction of the pedestrian relative to a direction of the nearest lane is less than a predetermined threshold and the nearest lane is same or adjacent to a lane of the ADV. In one embodiment, the locked heading direction is unlocked if the angle between the actual heading direction relative to the direction of the nearest lane is no longer less than the predetermined threshold or the nearest lane is no longer the same or adjacent to the lane of the ADV.

In one embodiment, the one or more image capturing device includes a camera device or a LIDAR device, wherein the facing direction of the pedestrian is determined by a camera device and the actual heading direction of the pedestrian is determined by a LIDAR device. In one embodiment, the lane includes a vehicle road lane or a pedestrian lane or a bike lane.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to avoid collision between an autonomous driving vehicle (ADV) and a pedestrian, comprising:
   identifying a pedestrian based on one or more images captured by one or more image capturing devices of the ADV;
   determining a facing direction of the pedestrian relative to the ADV as one of left/right side, front, or back;
   in response to the facing direction of the pedestrian being determined to be front or back facing, determining a lane nearest to the pedestrian,
   projecting the pedestrian onto a virtual representation of the nearest lane, the virtual representation of the nearest lane being within a generated virtual environment created based on the one ore more images;
   determining a lane direction of the nearest lane based on the facing direction of the pedestrian projected onto the virtual representation of the nearest lane;
   determining a predicted heading direction for the pedestrian, the predicted heading direction for the pedestrian being locked to the lane direction of the nearest lane in response to a predetermined condition being met;
   predicting a path followed by the pedestrian based on the predicted heading direction of the pedestrian; and
   generating a trajectory to control the ADV to avoid the pedestrian based on the predicted path.

2. The method of claim 1, further comprising determining an actual heading direction of the pedestrian based on a three-dimensional (3D) point cloud image produced by a light detection and ranging (LIDAR) device.

3. The method of claim 2, wherein the predetermined condition for determining that the predicted heading direction is locked is met when: an angle between the actual heading direction of the pedestrian relative to a direction of the nearest lane is less than a predetermined threshold and the nearest lane is same or adjacent to a lane of the ADV.

4. The method of claim 3, wherein the predetermined condition is not met and the predicted heading direction is unlocked if the angle between the actual heading direction relative to the direction of the nearest lane is no longer less than the predetermined threshold or the nearest lane is no longer the same or adjacent to the lane of the ADV.

5. The method of claim 1, wherein the one or more image capturing device includes a camera device or a light detection and ranging (LIDAR) device, wherein the facing direction of the pedestrian is determined by the camera device and the actual heading direction of the pedestrian is determined by the LIDAR device.

6. The method of claim 1, wherein the facing direction of the pedestrian is determined based on a two-dimensional (2D) point cloud image produced by a LIDAR device.

7. A non-transitory machine-readable medium having instructions stored therein, which when executed by a processor, cause the processor to perform operations, the operations comprising:
   identifying a pedestrian based on one or more images captured by one or more image capturing devices of an autonomous driving vehicle (ADV);
   determining a facing direction of the pedestrian relative to the ADV as one of left/right side, front, or back;
   in response to the facing direction of the pedestrian being determined to be front or back facing, determining a lane nearest to the pedestrian,
   projecting the pedestrian onto a virtual representation of the nearest lane, the virtual representation of the nearest lane being within a generated virtual environment created based on the one ore more images;
   determining a lane direction of the nearest lane based on the facing direction of the pedestrian projected onto the virtual representation of the nearest lane;
   determining a predicted heading direction for the pedestrian, the predicted heading direction for the pedestrian being locked to the lane direction of the nearest lane in response to a predetermined condition being met;
   predicting a path followed by the pedestrian based on the predicted heading direction of the pedestrian; and
   generating a trajectory to control the ADV to avoid the pedestrian based on the predicted path.

8. The non-transitory machine-readable medium of claim 7, wherein the operation further comprise determining an actual heading direction of the pedestrian based on a three-dimensional (3D) point cloud image produced by a light detection and ranging (LIDAR) device.

9. The non-transitory machine-readable medium of claim 8, wherein the predetermined condition for determining that the predicted heading direction is locked is met when an angle between the actual heading direction of the pedestrian relative to a direction of the nearest lane is less than a predetermined threshold and the nearest lane is same or adjacent to a lane of the ADV.

10. The non-transitory machine-readable medium of claim 9, wherein the predetermined condition is not met and the predicted heading direction is unlocked if the angle between the actual heading direction relative to the direction of the nearest lane is no longer less than the predetermined threshold or the nearest lane is no longer the same or adjacent to the lane of the ADV.

11. The non-transitory machine-readable medium of claim 7, wherein the one or more image capturing device includes a camera device or a light detection and ranging (LIDAR) device, wherein the facing direction of the pedestrian is determined by the camera device and the actual heading direction of the pedestrian is determined by the LIDAR device.

12. The non-transitory machine-readable medium of claim 7, wherein the facing direction of the pedestrian is determined based on a two-dimensional (2D) point cloud image produced by a LIDAR device.

13. A data processing system, comprising:
a processor; and
a memory coupled to the processor to store instructions, which when executed by the processor, cause the processor to perform operations, the operations including;
identifying a pedestrian based on one or more images captured by one or more image capturing devices of an autonomous driving vehicle (ADV);
determining a facing direction of the pedestrian relative to the ADV as one of left/right side, front, or back;
in response to the facing direction of the pedestrian being determined to be front or back facing, determining a lane nearest to the pedestrian,
projecting the pedestrian onto a virtual representation of the nearest lane, the virtual representation of the nearest lane being within a generated virtual environment created based on the one ore more images;
determining a lane direction of the nearest lane based on the facing direction of the pedestrian projected onto the virtual representation of the nearest lane;
determining a predicted heading direction for the pedestrian, the predicted heading direction for the pedestrian being locked to the lane direction of the nearest lane when a predetermined condition is met;
predicting a path followed by the pedestrian based on the predicted heading direction of the pedestrian; and
generating a trajectory to control the ADV to avoid the pedestrian based on the predicted path.

14. The system of claim 13, wherein the operation further comprise determining an actual heading direction of the pedestrian based on a three-dimensional (3D) point cloud image produced by a light detection and ranging (LIDAR) device.

15. The system of claim 14, the predetermined condition for determining that the predicted heading direction is locked is met when: an angle between the actual heading direction of the pedestrian relative to a direction of the nearest lane is less than a predetermined threshold and the nearest lane is same or adjacent to a lane of the ADV.

16. The system of claim 15, wherein the predetermined condition is not met and the predicted heading direction is unlocked if the angle between the actual heading direction relative to the direction of the nearest lane is no longer less than the predetermined threshold or the nearest lane is no longer the same or adjacent to the lane of the ADV.

17. The system of claim 13, wherein the one or more image capturing device includes a camera device or a light detection and ranging (LIDAR) device, wherein the facing direction of the pedestrian is determined by the camera device and the actual heading direction of the pedestrian is determined by the LIDAR device.

* * * * *